United States Patent [19]
Okumi et al.

[11] Patent Number: 5,652,821
[45] Date of Patent: Jul. 29, 1997

[54] PLASTIC-CLAD OPTICAL FIBER

[75] Inventors: Shinsuke Okumi; Takayuki Mishima; Kazuki Sogabe; Hiroyuki Kojima; Aiko Matsuda, all of Osaka, Japan

[73] Assignee: Sumitomo Electric Industries, Ltd., Osaka, Japan

[21] Appl. No.: 669,293

[22] PCT Filed: Oct. 31, 1995

[86] PCT No.: PCT/JP95/02221

§ 371 Date: Jun. 28, 1996

§ 102(e) Date: Jun. 28, 1996

[87] PCT Pub. No.: WO96/13739

PCT Pub. Date: May 9, 1996

[30]  Foreign Application Priority Data

Oct. 31, 1994  [JP]  Japan ................................ 6-266605

[51] Int. Cl.$^6$ .......................... G02B 6/00; C08F 120/18
[52] U.S. Cl. .......................... 385/145; 385/123; 385/144; 385/141; 526/329.7
[58] Field of Search .................. 385/123, 127, 385/128, 141, 142, 143, 144, 145; 526/329.7; 525/330.3

[56]  References Cited

U.S. PATENT DOCUMENTS

| | | | |
|---|---|---|---|
| 4,756,599 | 7/1988 | Maeda et al. | 385/145 X |
| 4,779,954 | 10/1988 | Tatsukami et al. | 385/145 X |
| 4,787,709 | 11/1988 | Kawada et al. | 385/145 X |
| 4,806,574 | 2/1989 | Krajewski et al. | 385/145 X |
| 5,080,508 | 1/1992 | Onishi et al. | 385/143 |
| 5,093,889 | 3/1992 | Kubo et al. | 385/145 |
| 5,111,526 | 5/1992 | Yamamoto et al. | 385/145 |
| 5,117,480 | 5/1992 | Yamamoto et al. | 385/145 |
| 5,479,555 | 12/1995 | Rot et al. | 385/145 |
| 5,491,770 | 2/1996 | Bonafini, Jr. | 385/145 |

FOREIGN PATENT DOCUMENTS

| | | | |
|---|---|---|---|
| 3-166206 | 7/1991 | Japan | 385/145 X |
| 3-182510 | 8/1991 | Japan | 385/145 X |
| 5-032749 | 2/1993 | Japan | 385/145 X |
| 7-218734 | 8/1995 | Japan | 385/145 X |
| 7-278255 | 10/1995 | Japan | 385/145 X |

*Primary Examiner*—Brian Healy
*Attorney, Agent, or Firm*—Cushman Darby & Cushman, IP Group of Pillsbury Madison & Sutro, LLP

[57]  ABSTRACT

A plastic-clad optical fiber having a cladding material formed from a cured material of a resin composition containing a urethane di(meth)acrylate represented by the general formula:

$$CH_2=CXCOO-\underset{\underset{(CH_2O)_l-(CH_2)_m-C_nF_{2n+1}}{|}}{CH}-CH_2O-CO-NH-R-$$

$$-NH-CO-O-\underset{\underset{(CH_2O)_l-(CH_2)_m-C_nF_{2n+1}}{|}}{CH}-CH_2O-COCX=CH_2$$

(I)

and a diluent can efficiently introduce light from a light source without sacrificing a band.

6 Claims, 6 Drawing Sheets

PLASTIC-CLAD OPTICAL FIBER

DESCRIPTION

This application claims benefit of international application PCT/JP95/02221, filed Oct. 31, 1995.

FIELD OF THE INVENTION

The present invention relates to a plastic-clad optical fiber.

RELATED ART

As a cladding material of a plastic-clad optical fiber, a silicone resin has hitherto been known (Japanese Patent Kokai Publication No. 30703/1983). However, this cladding material can not cope with the recently required simplification of a terminal processing by attachment of a crimp connector because of lack of a mechanical strength. On the other hand, as disclosed in Japanese Patent Kokai Publication No. 250047/1987, U.S. Pat. No. 4,707,076, Japanese Patent Kokai Publication Nos. 166206/1991 and 32749/1993, cladding materials comprising an ultraviolet curing resin composition are suggested. These resin compositions are superior in mechanical strength, because they have a crosslinked structure due to ultraviolet curing, and the crimp connector can be applied to an optical fiber comprising the resin composition as the cladding material. There is also an advantage that a production speed is improved when using these cladding materials.

Japanese Patent Kokai Publication No. 32749/1993 discloses that the content of fluorine is increased by incorporating a novel compound having a fluoroalkyl group and a urethane group into a cladding material to sufficiently decrease a refractive index.

However, the resin composition of Japanese Patent Kokai Publication No. 32749/1993 can give a low refractive index, but it has been found that a sufficient performance of the optical fiber (e.g. transmitting capability) can not be obtained if NA (numerical aperture) as a parameter representing a light coupling efficiency to a light source element in an optical fiber having the cladding material formed from these resin compositions is not within a specified range according to the type and diameter of a core material as well as the type of a resin composition used as the cladding material.

The structure NA of the optical fiber is represented by the following formula:

$$NA = \sqrt{(n_1^2 - n_2^2)}$$

wherein $n_1$ is a refractive index of a core; and $n_2$ is that of a cladding material.

Accordingly, the refractive index of the core may be increased or that of the cladding material may be decreased in order to increase NA.

However, a transmission band of the optical fiber becomes small when NA is increased much so as to efficiently introduce light from a light source into the optical fiber. As a result, it becomes impossible to conduct high-speed transmission. Accordingly, NA of the optical fiber must be within a suitable range.

SUMMARY OF THE INVENTION

An object of the present invention is to provide a plastic-clad optical fiber having high NA, wherein the high-speed transmission and the application of a crimp connector can be conducted.

The present invention provides a plastic-clad optical fiber comprising a core formed from quartz or optical glass and a cladding material formed from a plastic having a refractive index lower than that of the core, wherein the cladding material comprises a cured material of a resin composition containing a urethane di(meth)acrylate represented by the general formula (I):

wherein X is a hydrogen atom or a methyl group;
R is an alkyl group, an aryl group or a cyclic alkyl group;
l is 0 or 1;
m is 1 or 2; and n is an integer of 3 to 12, and a diluent, and a numerical aperture (NA) is in the range from 0.43 to 0.52.

DETAILED DESCRIPTION OF THE INVENTION

With respect to R in the general formula (I), the number of carbon atoms in the alkyl group is preferably from 1 to 10 and the number of carbon atoms in the aryl group is preferably from 6 to 20. The number of carbon atoms in the cyclic alkyl group is preferably from 3 to 30, more preferably from 5 to 20. The alkyl group is preferably —(CH$_2$)$_4$— or —(CH$_2$)$_6$—. The aryl group is preferably

The cyclic alkyl group is preferably n is preferably from 6 to 12.

It is necessary that the resin composition used as the cladding material of the plastic-clad optical fiber is uniformly and thinly applied on a core glass in the production of the optical fiber. Therefore, the viscosity of the resin composition is preferably from 100 to 10000 cps, particularly from 500 to 5000 cps and the resin composition used in the present invention contain a thickener. A urethane (meth)acrylate has been used as the thickener, but a conventional urethane (meth)acrylate comprises a raw diol having a comparatively small content of fluorine. Therefore, the refractive index was not sufficiently reduced. According to the present invention a urethane di(meth)acrylate (I) was synthesized by using a fluoroalkyl group-containing diol, thereby reducing the refractive index. It is possible to increase NA of the optical fiber and to apply a crimp connector by employing a cladding material formed from a cured material of a resin composition comprising the urethane di(meth)acrylate (I).

The urethane di(meth)acrylate (I) used in the present invention can be obtained by reacting a diol (A) having a fluoroalkyl group:

wherein l is 0 or 1; m is 1 or 2; and n is an integer of 3 to 12, with a diisocyanate (B):

(B)

wherein R is an alkyl group, an aryl group or a cyclic alkyl group, and then reacting the resultant product with (meth)acryl chloride or (meth)acrylic acid.

In the reaction between the diol (A) and diisocyanate (B), a catalyst (e.g. a known urethanizing catalyst such as dibutyltin dilaurate, dioctyltin dilaurate) may be used. An amount of the catalyst is usually from 0 to 10% by weight, preferably from 0.1 to 5% by weight, based on the weight of the diisocyanate (B). In the reaction between the diol (A) and diisocyanate (B), the reaction temperature is usually from 30° to 120° C. and the reaction time is usually from 1 to 24 hours.

In the reaction between the resultant product and (meth)acryl chloride or (meth)acrylic acid, a catalyst such as triethylamine and pyridine may be used. An amount of the catalyst is usually from 0 to 200 parts by weight, preferably from 70 to 120 parts by weight, based on 100 parts by weight of (meth)acryl chloride or (meth)acrylic acid in the reaction between the resultant product and (meth)acryl chloride or (meth)acrylic acid, the reaction temperature is usually from 20° to 100° C. and the reaction time is usually from 1 to 12 hours.

Specific examples of the diol (A) having a fluoroalkyl group include and the like.

Specific examples of the urethane di(meth)acrylate (I) include

The lower limit of the amount of the urethane di(meth)acrylate (I) is usually 5 parts by weight, preferably 10 parts by weight, more preferably 15 parts by weight, e.g. 20 parts by weight, based on 100 parts by weight of the resin composition. The upper limit of the amount of the urethane di(meth)acrylate (I) is usually 85 parts by weight, preferably 70 parts by weight, more preferably 60 parts by weight, e.g. 50 parts by weight, based on 100 parts by weight of the resin composition.

As described above, the composition of the present invention has a suitable viscosity, and it contains a diluent so as to adjust the viscosity. The diluent preferably contain a fluorine atom so as to reduce the refractive index of the resin composition. It is preferred that the diluent is a reactive diluent. The reactive diluent may be those which have no urethane group.

In the present invention, the reactive diluent is preferably at least one compound selected from the group consisting of (i) a mono(meth)acrylate having a fluoroalkyl group and (ii) a di(meth)acrylate having a fluorine atom. The reactive diluent may be a mixture of the mono(meth)acrylate (i) and di(meth)acrylate (ii). In this mixture, a weight ratio of the mono(meth)acrylate (i) to the di(meth)acrylate (II) may be from 1:10 to 10:1, preferably from 1:4 to 4:1, more preferably from 1:3 to 3:1, e.g. 1:2 to 2:1.

Examples of the reactive diluent include a mono(meth) acrylate having a fluoroalkyl group, which is represented by the formula:

$$CH_2=CXCOO(CH_2O)_l(CH_2)_mC_nF_{2n+1}$$

wherein X is a hydrogen atom or a methyl group; l is 0 or 1; m is 1 or 2; and n is an integer of 6 to 12, or the formula:

$$CH_2=CXCOO(CH_2O)_k(CH_2)_lC_mH_nF_{2m-n+1}$$

wherein X is a hydrogen atom or a methyl group; k is 0 or 1; l is 1 or 2; m is an integer of 6 to 12; and n is an integer of 1 to 12.

Specific examples of the mono(meth)acrylate having the fluoroalkyl group include the followings:

$$CH_2=CHCOOCH_2(CF_2)_5CF_3,$$

$$CH_2=CCH_3COOCH_2(CF_2)_5CF_3,$$

$$CH_2=CHCOO(CH_2)_2(CF_2)_5CF_3,$$

$$CH_2=CCH_3COOCH_2(CH_2)_2(CF_2)_5CF_3,$$

$$CH_2=CHCOO(CH_2)_2(CF_2)_6CF_3,$$

$$CH_2=CCH_3COOCH_2(CH_2)_2(CF_2)_6CF_3,$$

$$CH_2=CHCOO(CH_2)_2(CF_2)_7CF_3,$$

$$CH_2=CCH_3COOCH_2(CH_2)_2(CF_2)_7CF_3,$$

$$CH_2=CHCOOCH_2-O-CH_2(CF_2)_5CF_3,$$

$$CH_2=CCH_3COOCH_2-O-CH_2(CF_2)_5CF_3,$$

$$CH_2=CHCOOCH_2(CF_2)_5CF_2H,$$

$$CH_2=CCH_3COOCH_2CH_2(CF_2)_5CF_2H,$$

$$CH_2=CHCOOCH_2-O-CH_2(CF_2)_5CF_2H,$$

$$CH_2=CCH_3COOCH_2-O-CH_2(CF_2)_5CF_2H.$$

As the reactive diluent, there can also be used a mono (meth)acrylate having a hydroxy group and/or amino group and a fluoroalkyl group. Examples of said mono(meth) acrylate include the followings:

$$CH_2=CXCOOCHCH_2C_nF_{2n+1}$$
$$\mid$$
$$CH_2OH$$

wherein X is a hydrogen atom or a methyl group; and n is an integer of 6 to 12, $$CH_2=CXCOOCHCH_2O(CH_2)_mC_nF_{2n+1}$$
$$\mid$$
$$CH_2OH$$

wherein X is a hydrogen atom or a methyl group; m is 1 or 2; and n is an integer of 6 to 12, $$CH_2=CXCOOCHCH_2C_nF_{2n+1}$$
$$\mid$$
$$CH_2NH_2$$

wherein X is a hydrogen atom or a methyl group; and n is an integer of 6 to 12, $$CH_2=CXCOO=HCH_2O(CH_2)_mC_nF_{2n+1}$$

wherein X is a hydrogen atom or a methyl group; m is 1 or 2; and n is an integer of 6 to 12, $$CH_2=CXCOOCHCH_2C_mF_{2m+1}$$
$$\mid$$
$$CH_2OCCH_2OH$$
$$\mid$$
$$(CH_2)_nNH_2$$

wherein X is a hydrogen atom or a methyl group; m is an integer of 6 to 12; and n is an integer of 1 to 3, and $$CH_2=CXCOOCHO(CH_2)_lC_mF_{2m+1}$$
$$\mid$$
$$CH_2OCCH_2OH$$
$$\mid$$
$$(CH_2)_nNH_2$$

wherein X is a hydrogen atom or a methyl group; l is 1 or 2; m is an integer of 6 to 12; and n is an integer of 1 to 3.

Specific examples thereof include the followings:

$$CH_2=CXCOOCHCH_2(CF_2)_7CF_3$$
$$\mid$$
$$CH_2OH$$

$$CH_2=CXCOOCHCH_2O(CH_2)_2(CF_2)_5CF_3, \text{ and}$$
$$\mid$$
$$CH_2OH$$

$$CH_2=CXCOOCHCH_2(CF_2)_7CF_3$$
$$\mid$$
$$CH_2OCCH_2OH$$
$$\mid$$
$$(CH_2)_3NH_2$$

wherein X is a hydrogen atom or a methyl group.

There can also be included a di(meth)acrylate containing a fluorine atom, which can act as a reactive diluent and a crosslinking agent. Examples of said di(meth)acrylate containing the fluorine atom include the followings:

$$CH_2=CXCOOROCOCX=CH_2$$

wherein X is a hydrogen atom or a methyl group, R is $-(CH_2)_m-(CF_2)_n-(CH_2)_m-$ (m is 1 or 2; and n is an integer of 2 to 7)

$$-CH-CH_2-$$
$$\mid$$
$$(CH_2)_m-C_nF_{2n+1}$$

(m is 1 or 2; and n is an integer of 6 to 10).

Specific examples of the di(meth)acrylate having the fluorine atom include $$CH_2=CHCOOCH_2(CF_2)_4CH_2OCOCH=CH_2,$$

$$CH_2=CCH_3COOCH_2(CF_2)_4CH_2OCOCCH_3=CH_2,$$

$$CH_2=CHCOOCHCH_2OCOCH=CH_2$$
$$\mid$$
$$CH_2(CF_2)_7CF_3$$

$$CH_2=CHCOOCHCH_2OCOCH=CH_2$$
$$\mid$$
$$CH_2OCH_2(CF_2)_5CF_3 \ .$$

The lower limit of the amount of the reactive diluent is usually 1 part by weight, preferably 5 parts by weight, more preferably 10 parts by weight, most preferably 15 parts by weight, e.g. 20 parts by weight, based on 100 parts by weight of the resin composition. The upper limit of the amount of the reactive diluent is usually 95 part by weight, preferably 90 parts by weight, more preferably 85 parts by weight, most preferably 80 parts by weight, e.g. 75 parts by weight, based on 100 parts by weight of the resin composition.

The resin composition of the present invention may contain a coupling agent so as to improve adhesion properties between the resin composition and core glass. Examples of the coupling agent include dimethylethoxyvinylsilane, triethoxyvinylsilane, dimethylmethoxyvinylsilane, trimethoxyvinylsilane, 3-methacryloxypropyltrimethoxysilane, 3-(N-allyl-N-methacryloyl)aminopropytrimethoxysilane and the like.

An amount of the coupling agent is usually from 0 to 10 parts by weight, preferably from 0.01 to 10 parts by weight, more preferably from 0.1 to 5 parts by weight, based on 100 parts by weight of the resin composition.

It is preferred that the curing method of the resin composition of the present invention comprises an ultraviolet curing in view of the productivity of the optical fiber. An irradiation dose of ultraviolet light is usually from 0.01 to 10 J/cm$^2$. Therefore, the resin composition of the present invention may also contain a photopolymerization initiator. It is preferred that the photopolymerization initiator is a compound which can easily generate a free radical by ultraviolet irradiation. Examples of the photopolymerization initiator include benzophenone, acetophenone, benzyl, benzoin, benzoin methyl ether, benzoin isobutyl ether, benzyl dimethyl ketal, $\alpha,\alpha'$-azobisisobutyro-nitrile, benzoyl peroxide, 1-hydroxycyclohexyl phenyl ketone, 2,2-dimethoxy-2-phenylacetophenone, 2-hydroxy-2-methyl-1-phenylpropan-1-one and the like. Among them, 1hydroxycyclohexyl phenyl ketone, 2,2-dimethoxy-2-phenylacetophenone and 2-hydroxy-2-methyl-1-phenylpropan-1-one are particularly preferred.

An amount of the photopolymerization initiator is usually from 0 to 10 parts by weight, preferably from 0.01 to 10 parts by weight, more preferably from 0.1 to 5 parts by weight, based on 100 parts by weight of the resin composition.

In the plastic-clad optical fiber of the present invention, a diameter of the core may be from 50 to 2000 μm and a thickness of the cladding material may be from 5 to 100 μm.

The numerical aperture (NA) of the plastic-clad optical fiber of the present invention is from 0.43 to 0.52, preferably from 0.45 to 0.51.

PREFERRED EMBODIMENT OF THE INVENTION

The present invention will be illustrated by the following Preparative Examples and Examples which do not limit the present invention.

PREPARATIVE EXAMPLE 1

34.70 Parts by weight of a diol (A1) having a fluoroalkyl group, 160 parts by weight of isopropyl ether, 3.50 parts by weight of tetramethylene diisocyanate and 0.1 parts by weight of dibutyltin dilaurate were charged and, after reacting at 65° to 70° C. for 6 hours, the reaction mixture was washed once with an aqueous 10% sodium hydroxide solution, once with 10% hydrochloric acid, then twice with water to give 38.20 parts by weight of a product. To the resultant product, were added 4.10 parts by weight of acrylic acid and 3.28 parts by weight of triethylamine. After reacting at 65° to 70° C. until an OH group was disappeared, the reaction mixture was washed once with 10% hydrochloric acid, then twice with water to give 40.27 parts by weight of a urethane diacrylate (1).

Figure 1:
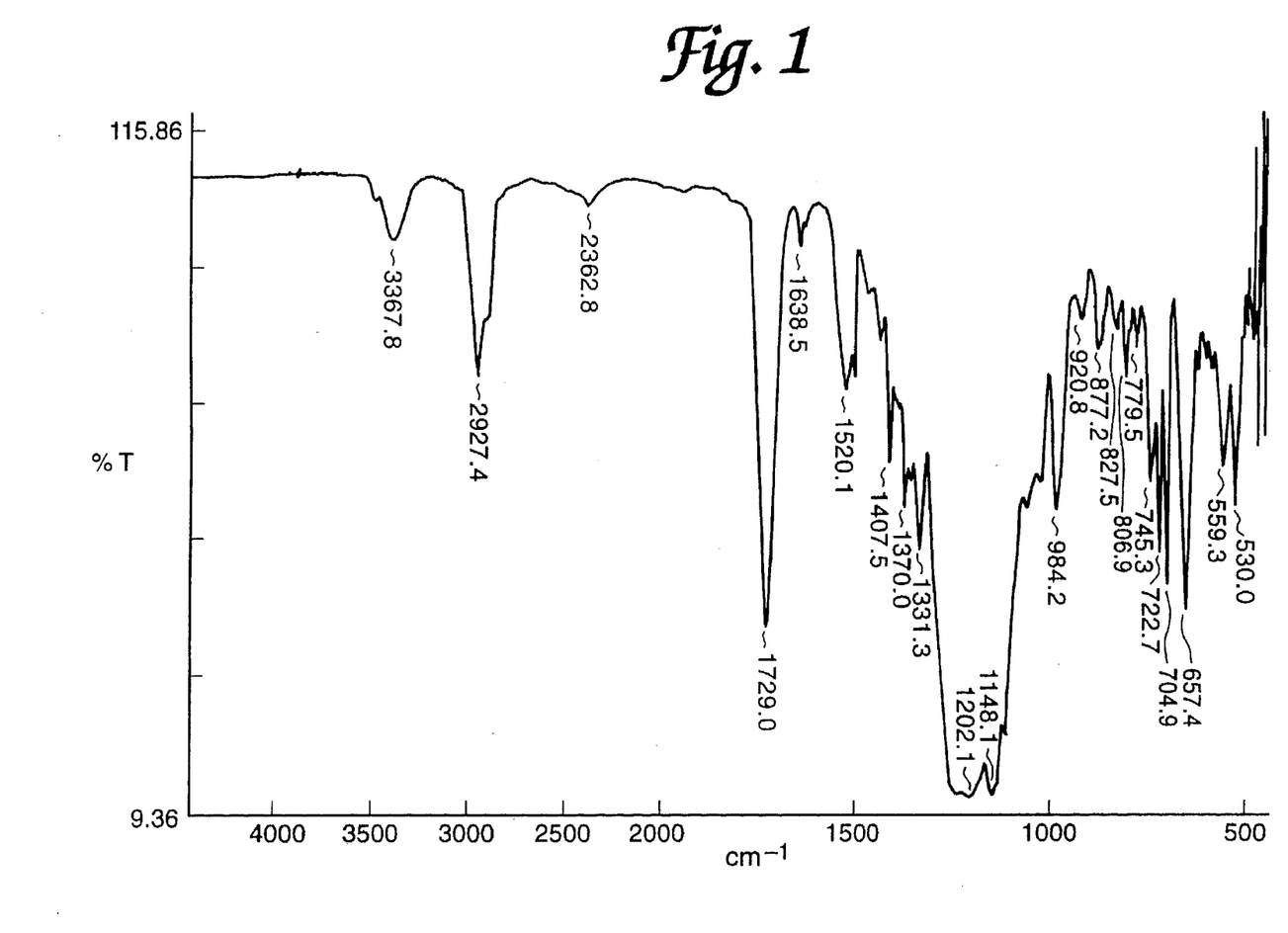
FIG. 1 is an IR spectra chart of the product obtained in Preparative Example 1.

An IR spectra chart of the resultant product is shown in FIG. 1.

PREPARATIVE EXAMPLE 2

21.90 Parts by weight of a diol (A2) having a fluoroalkyl group, 160 parts by weight of isopropyl ether, 4.20 parts by weight of hexamethylene diisocyanate and 0.1 parts by weight of dibutyltin dilaurate were charged and, after reacting at 65° to 70° C. for 8 hours, the reaction mixture was washed once with an aqueous 10% sodium hydroxide solution, once with 10% hydrochloric acid, then twice with water to give 26.10 parts by weight of a product. To the resultant product, were added 4.87 parts by weight of methacrylic acid and 3.28 parts by weight of triethylamine. After reacting at 65° to 70° C. until an OH group was disappeared, the reaction mixture was washed once with 10% hydrochloric acid, then twice with water to give 28.87 parts by weight of a urethane dimethacrylate (2).

Figure 2:
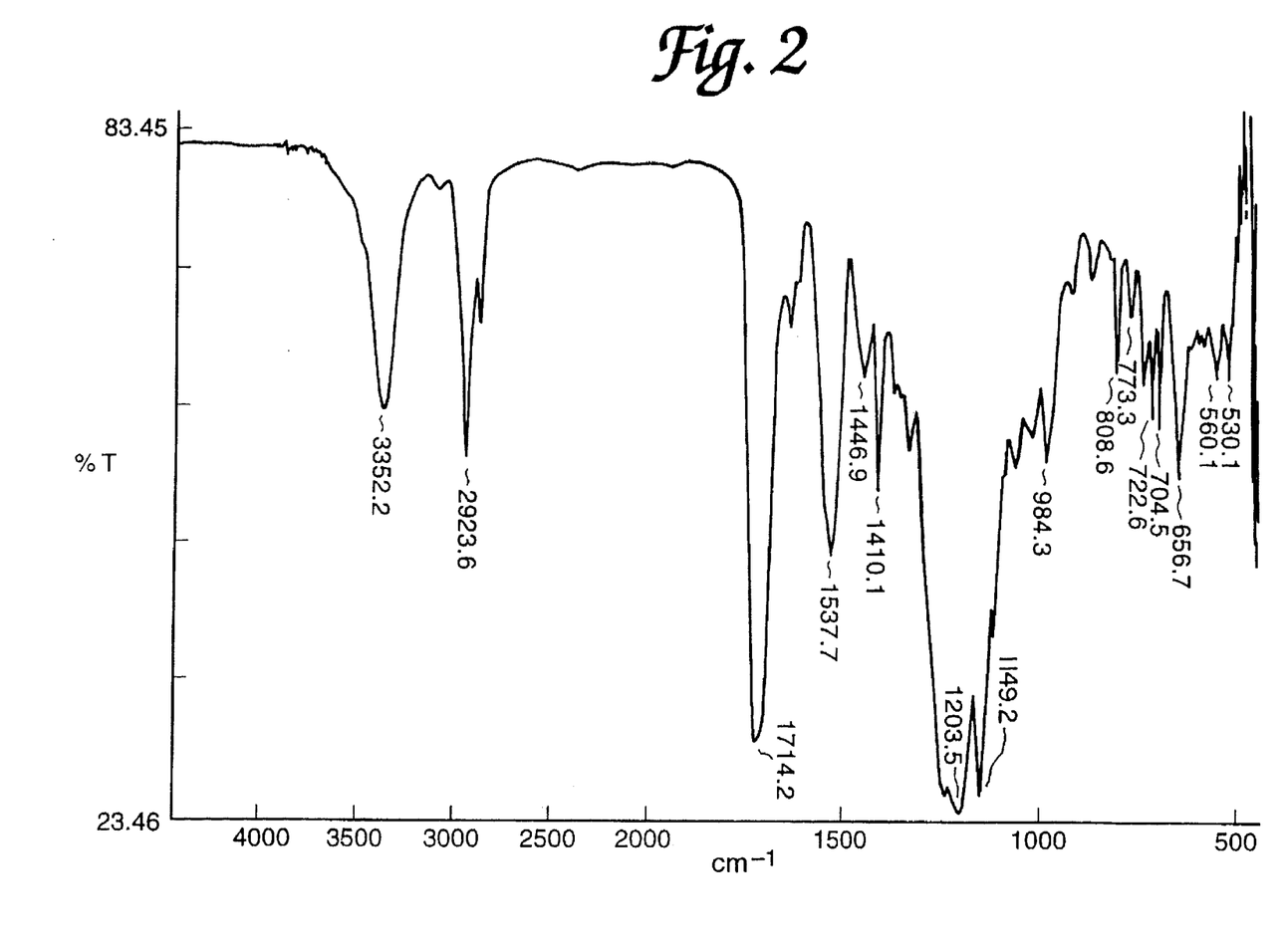
FIG. 2 is an IR spectra chart of the product obtained in Preparative Example 2.

An IR spectra chart of the resultant product is shown in FIG. 2.

PREPARATIVE EXAMPLE 3

30.13 Parts by weight of a diol (A3) having a fluoroalkyl group, 160 parts by weight of isopropyl ether, 4.20 parts by weight of toluene diisocyanate and 0.1 parts by weight of dibutyltin dilaurate were charged and, after reacting at 50° to 55° C. for 20 hours, the reaction mixture was washed once with an aqueous 10% sodium hydroxide solution, once with 10% hydrochloric acid, then twice with water to give 168.72 parts by weight of a product. To the resultant product, were added 4.87 parts by weight of methacrylic acid and 3.28 parts by weight of triethylamine. After reacting at 65° to 70° C. until an OH group was disappeared, the reaction mixture was washed once with 10% hydrochloric acid, then twice with water to give 34.04 parts by weight of a urethane dimethacrylate (3).

Figure 3:
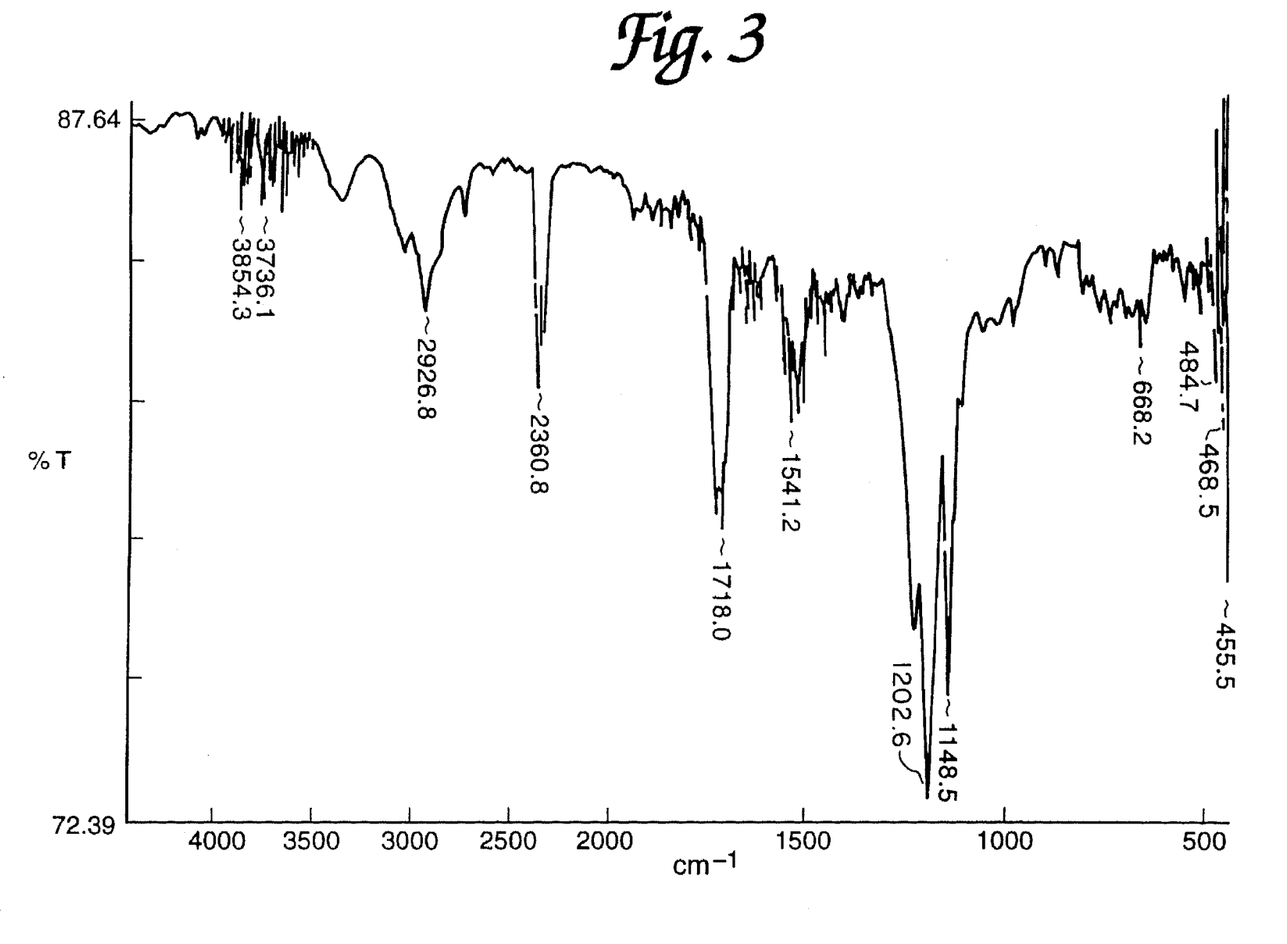
FIG. 3 is an IR spectra chart of the product obtained in Preparative Example 3.

An IR spectra chart of the resultant product is shown in FIG. 3.

PREPARATIVE EXAMPLE 4

25.40 Parts by weight of a diol (A4) having a fluoroalkyl group, 160 parts by weight of isopropyl ether, 4.15 parts by weight of cyclohexyl diisocyanate and 0.1 parts by weight of dibutyltin dilaurate were charged and, after reacting at 50° to 55° C. for 6 hours, the reaction mixture was washed once with an aqueous 10% sodium hydroxide solution, once with 10% hydrochloric acid, then twice with water to give 29.55 parts by weight of a product. To the resultant product, were added 4.10 parts by weight of acrylic acid and 3.28 parts by weight of triethylamine. After reacting at 65° to 70° C. until an OH group was disappeared, the reaction mixture was washed once with 10% hydrochloric acid, then twice with water to give 31.62 parts by weight of a urethane diacrylate (4).

Figure 4:
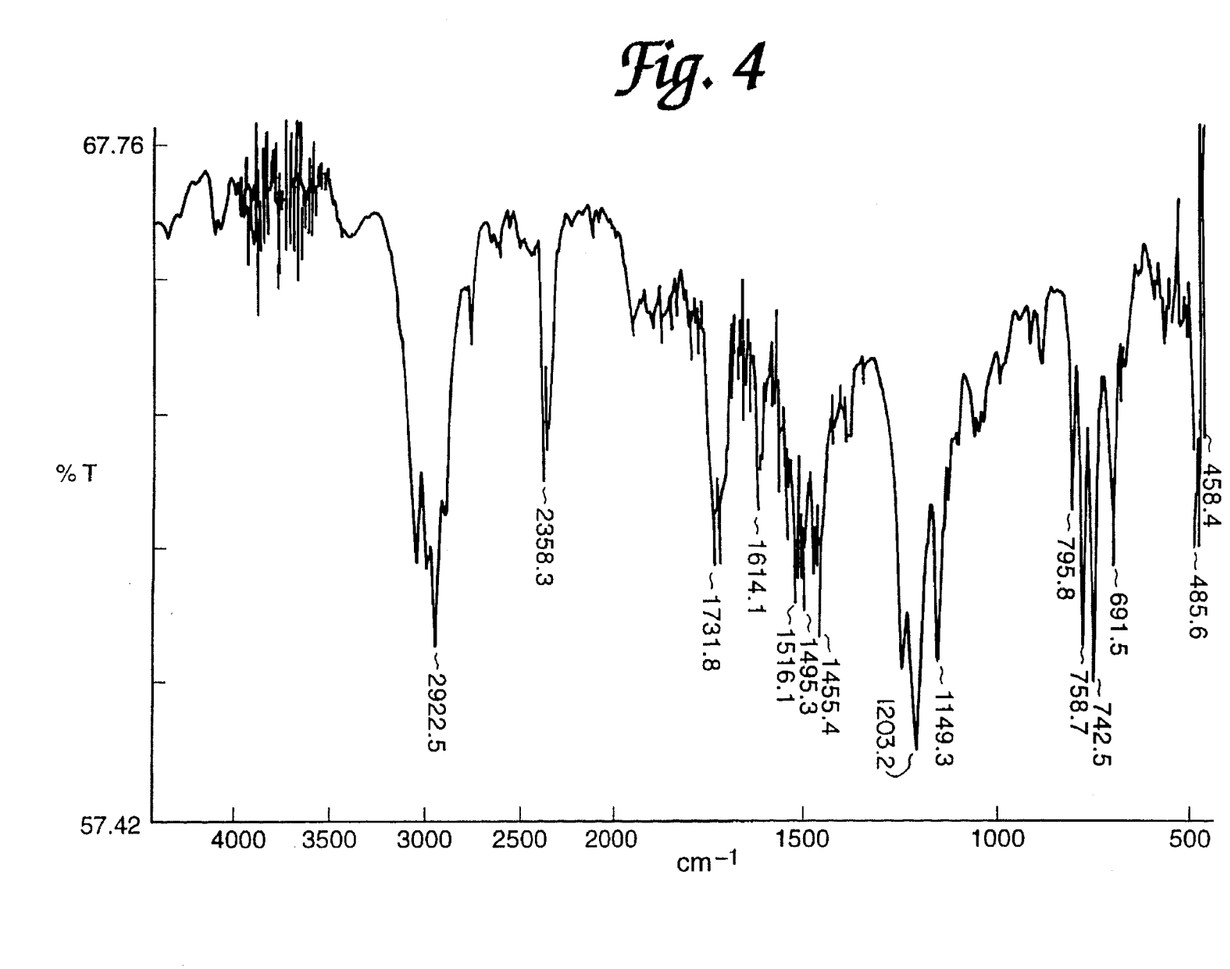
FIG. 4 is an IR spectra chart of the product obtained in Preparative Example 4.

An IR spectra chart of the resultant product is shown in FIG. 4.

PREPARATIVE EXAMPLE 5

25.90 Parts by weight of a diol (A5) having a fluoroalkyl group, 160 parts by weight of isopropyl ether, 5.53 parts by weight of isophorone diisocyanate and 0.1 parts by weight of dibutyltin dilaurate were charged and, after reacting at 55° to 60° C. for 12 hours, the reaction mixture was washed once with an aqueous 10% sodium hydroxide solution, once with 10% hydrochloric acid, then twice with water to give 31.43 parts by weight of a product. To the resultant product, were added 4.10 parts by weight of acrylic acid and 3.28 parts by weight of triethylamine. After reacting at 65° to 70° C. until an OH group was disappeared, the reaction mixture was washed once with 10% hydrochloric acid, then twice with water to obtain 33.49 parts by weight of a urethane diacrylate (5).

Figure 5:
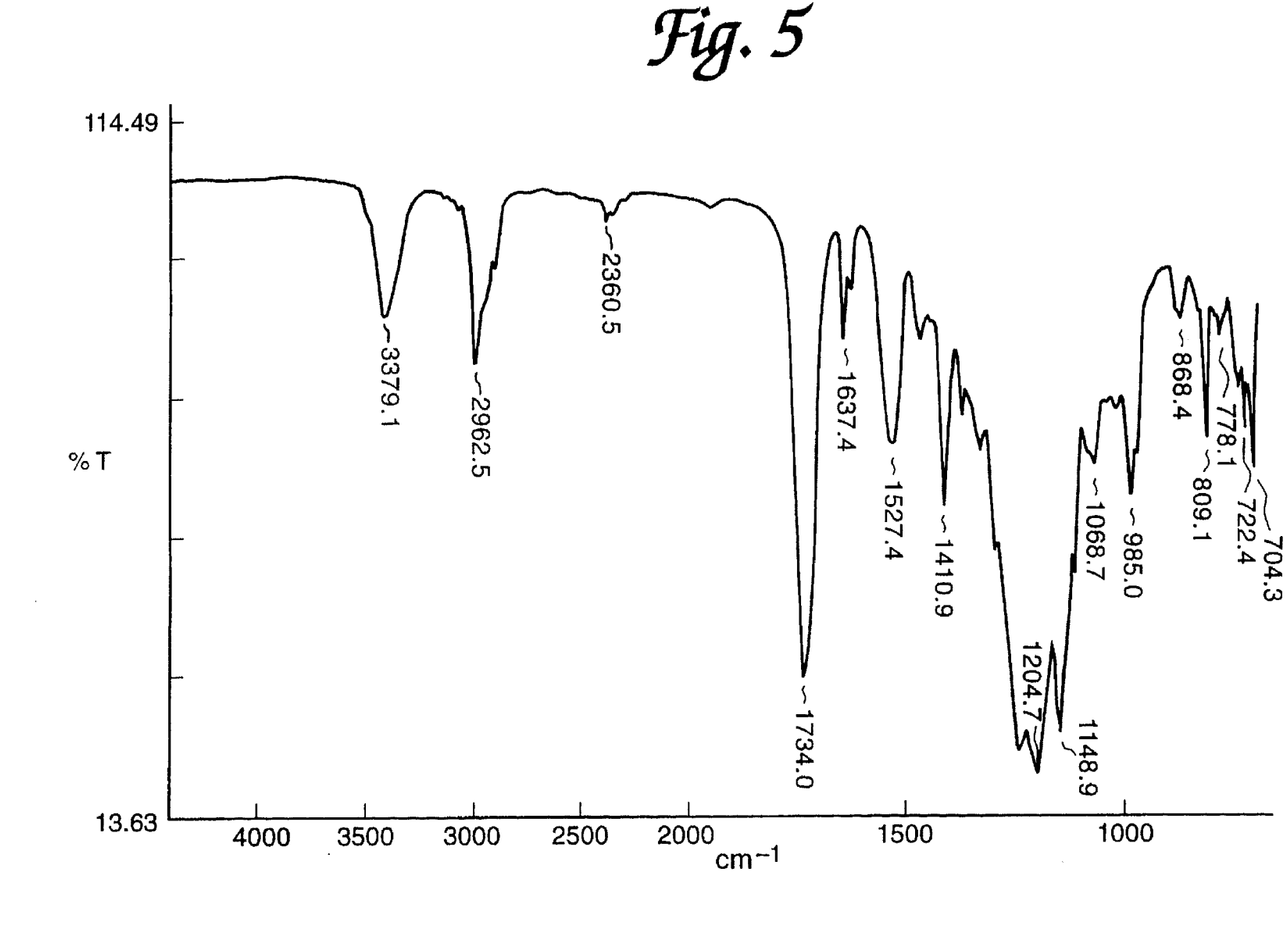
FIG. 5 is an IR spectra chart of the product obtained in Preparative Example 5.

An IR spectra chart of the resultant product is shown in FIG. 5.

COMPARATIVE PREPARATIVE EXAMPLE 1

376.0 Parts by weight of 3-(perfluoro-n-hexyl)-propenoxide, 86.5 parts by weight of acrylic acid, 2.3 parts by weight of tetramethylammonium chloride and 0.23 parts by weight of hydroquinone monoether were charged and the mixture was reacted at 90° to 95° C. for 15 hours. The resultant reaction mixture was dissolved in 1500 ml of toluene and, after washing three times with an aqueous 15% sodium carbonate solution, then three times with 20% saline, toluene was distilled off under a reduced pressure to give 425.0 parts by weight of a colorless liquid.

Figure 6:
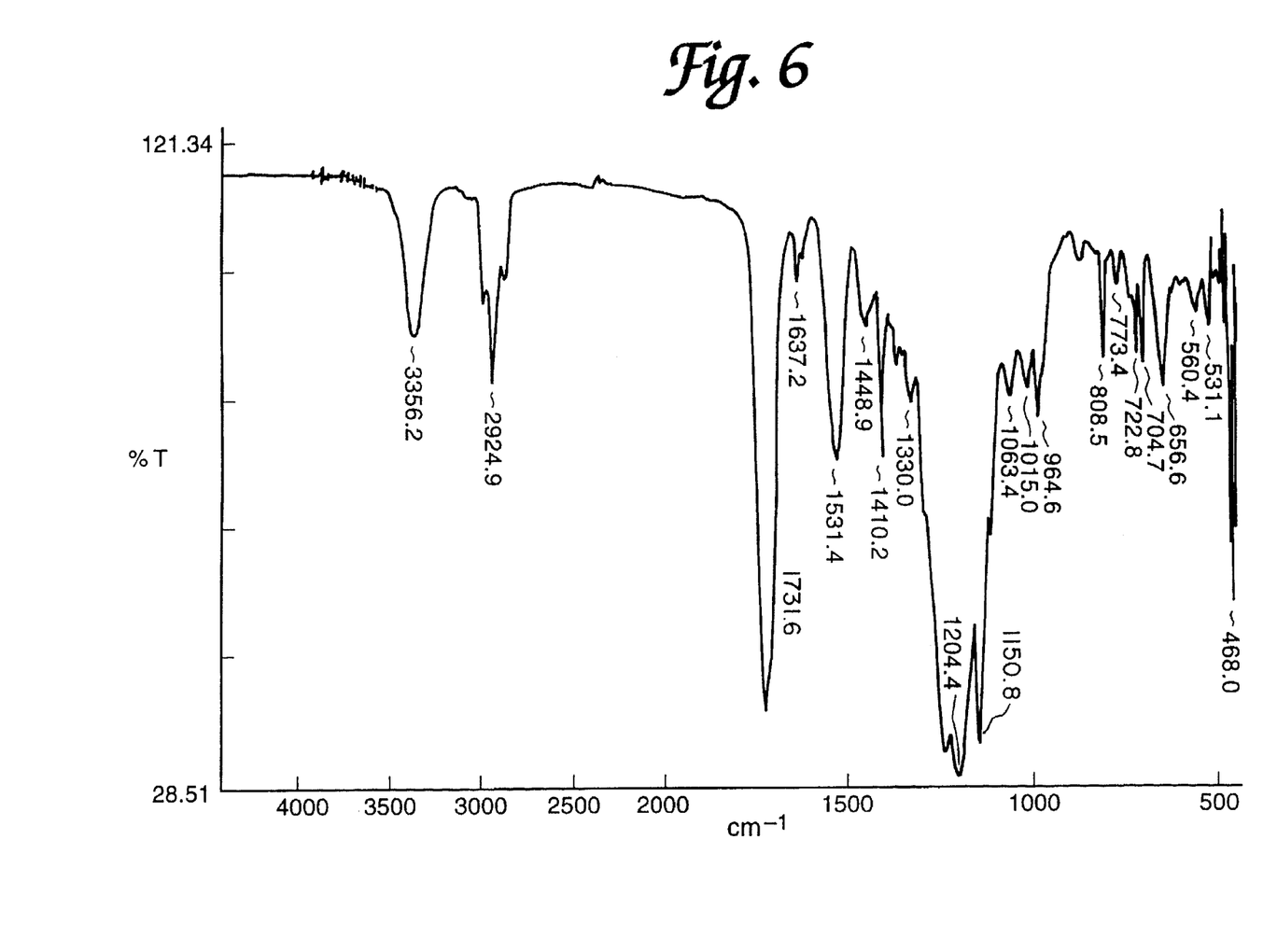
FIG. 6 is an IR spectra chart of the product obtained in Comparative Preparative Example 1.

Then, 59.0 parts by weight of 1,6-hexanediol and 222.3 parts by weight of isophorone diisocyanate were charged and the mixture was reacted at 75° to 80° C. while heating and cooling for 5 hours. Then, 4448.0 parts by weight of a mixture of the above fluorine-containing acrylate ester was added and, after uniformly dissolving with stirring at 75° to 80° C. for one hour, the mixture was cooled to 60° C. and 0.34 parts by weight of dibutyltin dilaurate was added. The reaction was conducted at 60° to 65° C. for one hour, then 80° to 85° C. for 5 hours to give a urethane diacrylate (6). An IR spectra chart of the resultant product is shown in FIG. 6.

The diols used in the Preparative Examples are shown in Table I and the resultant urethane diacrylates are shown in Table II.

TABLE I (A1)  HO—CH—CH$_2$—OH
             |
             CH$_2$(CF$_2$)$_{11}$CF$_3$ (A2)  HO—CH—CH$_2$—OH
             |
             CH$_2$O(CH$_2$)$_2$(CF$_2$)$_5$CF$_3$ (A3)  HO—CH—CH$_2$—OH
             |
             CH$_2$O(CH$_2$)$_2$(CF$_2$)$_7$CF$_3$ (A4)  HO—CH—CH$_2$—OH
             |
             (CH$_2$)$_2$(CF$_2$)$_7$CF$_3$ (A5)  HO—CH—CH$_2$—OH
             |
             CH$_2$(CF$_2$)$_7$CF$_3$

TABLE II (1) CH$_2$=CHCOO—CH—CH$_2$—O—CONH—(CH$_2$)$_4$—NHCOO—CH—CH$_2$O—COCH=CH$_2$
                        |                                              |
                        CH$_2$(CF$_2$)$_{11}$CF$_3$                    CH$_2$(CF$_2$)$_{11}$CF$_3$ (2) CH$_2$=CCOO—CH—CH$_2$O—CONH—(CH$_2$)$_6$—NHCOO—CH—CH$_2$O—COC=CH$_2$
          |         |                                              |         |
          CH$_3$    CH$_2$O(CH$_2$)$_2$(CF$_2$)$_5$CF$_3$           CH$_2$O(CH$_2$)$_2$(CF$_2$)$_5$CF$_3$   CH$_3$ (3) CH$_2$=CCOO—CHCH$_2$O—CONH—⟨C$_6$H$_4$(CH$_3$)⟩—NHCOO—CH—CH$_2$O—COC=CH$_2$
          |         |                                              |         |
          CH$_3$    CH$_2$O(CH$_2$)$_2$(CF$_2$)$_7$CF$_3$           CH$_2$O(CH$_2$)$_2$(CF$_2$)$_7$CF$_3$   CH$_3$ (4) CH$_2$=CHCOO—CH—CH$_2$O—CONH—⟨cyclohexyl⟩—NHCOO—CH—CH$_2$O—COCH=CH$_2$
                  |                                              |
                  (CH$_2$)$_2$(CF$_2$)$_7$CF$_3$                 (CH$_2$)$_2$(CF$_2$)$_7$CF$_3$ (5) CH$_2$=CHCOO—CH—CH$_2$—O—CONH—⟨isophorone⟩—CH$_2$—NHCOO—CH—CH$_2$O—COCH=CH$_2$
                  |                                                    |
                  CH$_2$(CF$_2$)$_7$CF$_3$                             CH$_2$(CF$_2$)$_7$CF$_3$ (6) CH$_2$=CHCOO—CH—CH$_2$—O—CONH—⟨isophorone⟩—CH$_2$—NHCOO—(CH$_2$)$_6$—O—
                  |
                  CH$_2$(CF$_2$)$_5$CF$_3$ —CONH—⟨isophorone⟩—CH$_2$—NHCOO—CH—CH$_2$O—COCH=CH$_2$
                                        |
                                        CH$_2$(CF$_2$)$_8$CF$_3$

EXAMPLES 1 TO 9 AND COMPARATIVE EXAMPLES 1 TO 3

Immediately after a quartz glass rod was drawn to form a fiber having an outer diameter of 200 μm, a resin composition having a composition shown in Table III was applied on the fiber and then ultraviolet-cured to give a plastic-clad optical fiber having an outer diameter of 250 μm.

The viscosity of the resin composition and the refractive index of light having a wavelength of 589 nm at 23° C. of the resin composition after the curing, the NA of the plastic-clad optical fiber and the light coupling power between an optical link and the optical fiber were measured. Furthermore, it was confirmed whether or not the light can be transmitted at 10 Mbps·1 km and 2 Mbps·1 km. The results are shown in Table IV.

What is claimed is:

1. A plastic-clad optical fiber comprising a core formed from quartz or optical glass and a cladding material formed from a plastic having a refractive index lower than that of the core, wherein the cladding material comprises a cured material of a resin composition containing a urethane di(meth)acrylate represented by the general formula (I):

TABLE III

| | Ex. 1 | Ex. 2 | Ex. 3 | Ex. 4 | Ex. 5 | Ex. 6 | Ex. 7 | Ex. 8 | Ex. 9 | Com. Ex. 1 | Com. Ex. 2 | Com. Ex. 3 |
|---|---|---|---|---|---|---|---|---|---|---|---|---|
| Urethane diacrylate (1) | 50 | 0 | 0 | 0 | 0 | 0 | 0 | 83 | 0 | 0 | 55 | 0 |
| Urethane diacrylate (2) | 0 | 35 | 0 | 0 | 0 | 0 | 0 | 0 | 0 | 0 | 0 | 0 |
| Urethane diacrylate (3) | 0 | 0 | 25 | 0 | 0 | 0 | 0 | 0 | 0 | 0 | 0 | 98 |
| Urethane diacrylate (4) | 0 | 0 | 0 | 20 | 0 | 50 | 0 | 0 | 38 | 0 | 0 | 0 |
| Urethane diacrylate (5) | 0 | 0 | 0 | 0 | 30 | 0 | 50 | 0 | 0 | 0 | 0 | 0 |
| Urethane diacrylate (6) | 0 | 0 | 0 | 0 | 0 | 0 | 0 | 0 | 0 | 30 | 0 | 0 |
| $CH_2=CHCOO(CH_2)_2(CF_2)_7CF_3$ | 20 | 30 | 30 | 36 | 35 | 0 | 48 | 15 | 60 | 35 | 35 | 0 |
| $CH_2=CHCOOCHCH_2OCOCH=CH_2$ \| $CH_2(CF_2)_7CF_3$ | 28 | 33 | 43 | 43 | 33 | 48 | 0 | 0 | 0 | 33 | 8 | 0 |
| $CH_2=CH-Si(CH_3)_2-OC_2H_5$ | 1 | 1 | 1 | 1 | 1 | 1 | 1 | 1 | 1 | 1 | 1 | 1 |
| Phenyl-cyclohexyl ketone (C(OH)) | 1 | 1 | 1 | 1 | 1 | 1 | 1 | 1 | 1 | 1 | 1 | 1 |

TABLE IV

| | Ex. 1 | Ex. 2 | Ex. 3 | Ex. 4 | Ex. 5 | Ex. 6 | Ex. 7 | Ex. 8 | Ex. 9 | Com. Ex. 1 | Com. Ex. 2 | Com. Ex. 3 |
|---|---|---|---|---|---|---|---|---|---|---|---|---|
| Refractive index (23° C.) | 1.365 | 1.370 | 1.375 | 1.380 | 1.385 | 1.378 | 1.373 | 1.379 | 1.368 | 1.401 | 1.359 | 1.397 |
| Viscosity (23° C.) [cps] | 1010 | 1210 | 1110 | 1200 | 1310 | 1200 | 980 | 1150 | 950 | 1800 | 900 | 1000 |
| NA | 0.51 | 0.50 | 0.49 | 0.47 | 0.46 | 0.48 | 0.49 | 0.47 | 0.51 | 0.41 | 0.53 | 0.42 |
| Light coupling power [dBm] | −15.1 | −15.5 | −15.7 | −15.8 | −16.1 | −15.7 | −15.6 | −15.8 | −15.3 | −17.1 | −14.1 | −16.7 |
| 10 Mbps · 1 km transmission | Yes | Yes | Yes | Yes | Yes | Yes | Yes | Yes | Yes | No | No | No |
| 2 Mbps · 1 km transmission | Yes | Yes | Yes | Yes | Yes | Yes | Yes | Yes | Yes | Yes | Yes | Yes |

EFFECT OF THE INVENTION

The plastic-clad optical fiber of the present invention can efficiently introduce light from a light source because it has larger NA than that of a conventional optical fiber. Furthermore, the optical fiber of the present invention can conduct a long-distance high-speed transmission in comparison with the case using the conventional optical fiber when using the same optical light source element because it has the NA within a suitable range. Therefore, the optical fiber of the present invention is useful as an optical fiber for an optical communication system and a light guide.

wherein X is a hydrogen atom or a methyl group; R is an alkyl group, an aryl group or a cyclic alkyl group; $l$ is 0 or 1; m is 1 or 2; and n is an integer of 3 to 12, and a diluent, and a numerical aperture (NA) is in the range from 0.43 to 0.52.

2. The plastic-clad optical fiber according to claim 1, wherein the alkyl group is $-(CH_2)_4-$ or $-(CH_2)_6-$, the aryl group is and the cyclic alkyl group is 3. The plastic-clad optical fiber according to claim 1, wherein the diluent is at least one compound selected from the group consisting of (i) a mono(meth)acrylate having a fluoroalkyl group and (ii) a di(meth)acrylate having a fluorine atom.

4. The plastic-clad optical fiber according to claim 3, wherein the mono(meth)acrylate (I) is represented by the formula:

$$CH_2{=}CXCOO(CH_2O)_l(CH_2)_m C_n F_{2n+1}$$

wherein X is a hydrogen atom or a methyl group; I is 0 or 1; m is 1 or 2; and n is an integer of 6 to 12, or the formula:

$$CH_2{=}CXCOO(CH_2O)_k(CH_2)_l C_m H_n F_{2m-n+1}$$

wherein X is a hydrogen atom or a methyl group; k is 0 or 1; l is 1 or 2; m is an integer of 6 to 12; and n is an integer of 1 to 12.

5. The plastic-clad optical fiber according to claim 3, wherein the di(meth)acrylate (II) is represented by the formula:

$$CH_2{=}CXCOOROCOCX{=}CH_2$$

wherein X is a hydrogen atom or a methyl group; R is $-(CH_2)_m-(CF_2)_n-(CH_2)_m-$ (m is 1 or 2; and n is an integer of 2 to 7)

$$\begin{array}{c}-CH-CH_2-\\|\\(CH_2)_m-C_nF_{2n+1}\end{array}$$

(m is 1 or 2; and n is an integer of 6 to 10).

6. The plastic-clad optical fiber according to claim 3, wherein the diluent is a mixture of the mono(meth)acrylate (i) and di(meth)acrylate (ii).

* * * * *